Patented May 26, 1953

2,640,048

UNITED STATES PATENT OFFICE 2,640,048

CHLOROSULFONATION OF POLYTHENE USING AZO CATALYSTS

John S. Beekley, Wilmington, Del., assignor to E. I. du Pont de Nemours and Company, Wilmington, Del., a corporation of Delaware No Drawing. Application June 30, 1951, Serial No. 234,685. In Canada January 12, 1949

3 Claims. (Cl. 260—79.3)

This invention relates to improved processes of preparing high molecular weight substituted ethylene polymers and, more particularly, to new catalysts for their preparation. This application is a continuation-in-part of my copending application S. N. 9,017, filed February 17, 1948.

It is known that aliphatic hydrocarbons of high molecular weight, especially the solid, substantially saturated, olefin polymers derived from ethylene and other monoolefins containing not more than 5 carbon atoms, can be converted to a sulfonyl chloride by treatment with a gaseous mixture of chlorine and sulfur dioxide. Moreover, these chlorosulfonated hydrocarbons, which may be mono- and/or polysulfonyl chlorides, can be hydrolyzed and neutralized to mono- and/or polysulfonic acids and their salts. These products, with involved processes for their preparation, are described in the McQueen Patent 2,212,786, issued August 27, 1940, wherein the aforesaid products are prepared by subjecting a high molecular weight aliphatic hydrocarbon to the action of a gaseous mixture of sulfur dioxide and chlorine. The patentee preferably uses actinic light as an initiator or catalyst for the chlorosulfonation.

Similar products are prepared from the high molecular weight hydrocarbons, and more particularly from the normally solid polymers of ethylene, obtained by polymerizing ethylene under elevated temperatures and superatmospheric pressures, in accord with the process of the McAlevy et al. Patent 2,405,971, issued August 20, 1946. By the process of this patent, the sulfonyl chlorides of such polymeric hydrocarbons are produced by reacting the polymer with a sulfur oxy chloride such as sulfuryl chloride in the presence or absence of chlorine. This patentee uses benzoyl peroxide in lieu of actinic light to catalyze the reaction.

An object of the invention is to provide an improved method of initiating the chlorosulfonation of hydrocarbons. Another object is to provide new catalysts for the reaction of hydrocarbons of high molecular weight, and especially solid polymeric olefins, with chlorine and sulfur dioxide, with sulfuryl chloride, with chlorine and sulfuryl chloride or with similar reactants. A further object resides in the provision of a new class of catalysts for the aforesaid reactions. Other objects and advantages of the invention will hereinafter appear.

These and other objects are practiced in accord with the invention by processing hydrocarbons of high molecular weight, and more particularly normally solid polymeric ethylene to halosulfonated hydrocarbons and/or polymers using as catalysts for the reaction an organic azo compound wherein the azo, —N=N—, group is acylic and bonded from both of the nitrogens to carbons which are aliphatic in character and at least one of which carbons is tertiary, i. e., attached to three other carbons by single valences. The reaction is conducted under the well-known conditions for preparing such substituted hydrocarbons and/or polymers such, for example, as the conditions described in the McQueen and McAlevy et al. patents.

One method of practicing the invention is by way of a batch operation. A stainless steel-lined vessel is charged with polymeric ethylene dissolved, for example, in carbon tetrachloride to which the azo catalyst is added. The vessel is fitted with a reflux condenser and with suitable inlets for the introduction of chlorine and sulfur dioxide. After closing the vessel, these gases are introduced and the reaction mixture heated to about its boiling point, 50° C. to 80° C. according to the superimposed pressure. The ratio of sulfur dioxide to chlorine used is adjusted to give the particular type of product desired. For example, an excess of chlorine over that normally required is introduced for the production of high chlorine content product and alternatively an excess of sulfur dioxide, on the same basis, being used for the preparation of a high sulfur containing product. Irrespective of the composition of the desired polymer, however, an excess of the reacting gases should be added. The amount of excess may vary from 10% excess chlorine to 300-400% excess sulfur dioxide. After the reaction, the solvent is removed by distillation and the last traces by the use of reduced pressure.

The chlorosulfonated hydrocarbon and/or polymer thus obtained can be mixed with suitable compounding ingredients as described, for example, in the McAlevy et al. Patents 2,416,060 and 2,416,061, issued February 18, 1947, for the preparation of elastomers. Contrariwise, they may be hydrolyzed and neutralized by boiling with alkali metal hydroxide solutions to give sulfonic acids and their salts. Usually a period of several hours is required to hydrolyze part or all of the material that is water soluble depending, inter alia, on the type and molecular weight of hydrocarbon used.

As a rule, the amount of azo catalyst employed will range from 0.001% to about 3% of the total weight of the hydrocarbon being charged into the reaction vessel. It is preferable, however, to add as small an amount of catalyst as possible in order to avoid undue catalylst contamination and for economical reasons. Usually from 0.1% to 2% of catalyst based on the weight of polymer charged will give satisfactory initiation of the reaction and a continued smooth, uniform reaction rate.

Practice of the invention is illustrated by the following examples in which parts are by weight unless otherwise specified.

*Example 1.*—A solution was prepared containing 100 parts of polythene, having a molecular weight between 15,000 to 20,000, dissolved in 2000 parts of carbon tetrachloride. This solution was placed in a reaction vessel from which light was excluded. Chlorine was passed into the vessel, held at 70° C. for a period of 2 hours, the reaction mixture was cooled to 55° C. and the sulfur dioxide passed into the reaction vessel. The polythene was reacted with 192 parts of chlorine and 78 parts of sulfur dioxide. The chlorosulfonated polymer contained 36.4% chlorine and 3.39% sulfur, giving a chlorine efficiency of 66.5% and a sulfur dioxide efficiency of 15.3%.

The above reaction was conducted under substantially identical conditions and reactants with the single exception that 0.5 part of alpha, alpha'-azobisdiisobutyronitrile catalyst was used. In this reaction the polythene reacted with 174 parts of chlorine and 63 parts of sulfur dioxide. Analysis of the products showed 40.5% chlorine and 3.77% sulfur. A chlorine efficiency of 89.2% and a sulfur dioxide efficiency of 89.2% was obtained. The efficiency calculations are based on the involved reactions in the chlorosulfonation of polythene which are:

(1) 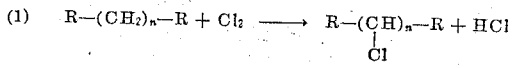

(2)

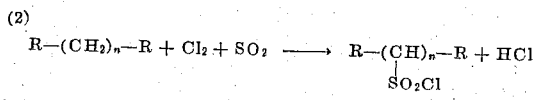

Therefore, every chlorine molecule reacting gives one molecule of hydrochloric acid and every sulfur dioxide molecule reacting incorporates an equivalent weight of oxygen to sulfur in the compound.

*Example 2.*—Twenty-five parts of a polymer of ethylene having a melt viscosity of 0.1 is dissolved with heating in 500 parts of carbon tetrachloride. Into this mixture 0.2 part of alpha, alpha'-azodiisobutyronitrile and 15 parts of sulfuryl chloride and 40.5 parts chlorine are added and the mixture heated under reflux at approximately 77° C. for 60 minutes. The reaction mixture is drawn off, drowned in 1500 parts of methanol to precipitate the substituted polymer, and after decantation and filtration, the methanol is removed by treatment with steam. The product analyzed about 47% chlorine and 0.56% sulfur.

*Example 3.*—Fifty parts of ethylene polymer prepared by polymerization of ethylene at 200° C. and 1200 atmospheres pressure in the presence of diethyl peroxide and having a melt viscosity of 2 was dissolved in 950 parts of carbon tetrachloride and the solution boiled for 5 minutes to dispel dissolved gases. Upon cooling the solution to 64° C., 0.25 part of alpha, alpha'-azo bis alpha gamma-dimethyl-valeronitrile was added to the resulting solution and 56 parts chlorine gradually added over a period of 46 minutes. During the last 10 minutes, 4.3 parts of sulfur dioxide was added to the reaction mixture maintained at 48° C. A chlorosulfonated polymer of ethylene, containing 29.7% chlorine and 0.63% sulfur was isolated from the carbon tetrachloride solution by steam distillation of the solvent and air-drying of the precipitated polymer at a temperature of about 60° C.

*Example 4.*—Forty parts of ethylene polymer prepared by polymerization of ethylene at 200° and 1200 atmospheres pressure in the presence of diethyl peroxide and having a melt viscosity of 2 was dissolved in 960 parts of carbon tetrachloride at 65° C. and the solution supplied continuously to a reaction train consisting of two stirred reactors to which was also supplied continuously .04 part of alpha, alpha'-azo bis alpha, gamma-dimethylvaleronitrile as a reaction initiator, 50 parts of chlorine and 7 parts of sulfur dioxide. A chlorosulfonated polymer of ethylene containing 21.2% chlorine and 0.75% sulfur was isolated from the carbon tetrachloride solution by steam distillation of the solvent and air drying of the precipitated granular polymer at a temperature of about 60° C.

The melt viscosity referred to in examples 2, 3 and 4 was determined by this method. An aluminum cylinder of ⅜" internal diameter, open at the top, was fitted at the bottom with an 8 mm. steel disk containing at its center a 2.1 mm. orifice. The cylinder and disk were heated to a temperature of 190° C. and the product to be tested introduced and heated to the same temperature. Above the surface of the product a piston heated to 190° C. and ½" in diameter was superimposed, and upon it a weight was placed giving a combined weight of piston plus the weight of 2.16 kg. The weight of product flowing from the orifice in decigrams per minute is taken as a measure of melt viscosity.

The azo catalysts of the invention have substituents which are essentially unreactive in character and which, therefore, do not interfere with the chlorosulfonation reaction. Catalysts which are particularly effective in chlorosulfonation are azo compounds which have an acyclic azo, —N=N—, group bonded to different aliphatic or cyclo-aliphatic groups, at least one of which is tertiary. The preferred catalysts within this class are those in which the tertiary carbon has attached to it, through carbon, a radical in which three remaining valences of the latter carbon are satisfied by at least one element of oxygen or nitrogen. Symmetrical azo compounds having two tertiary carbons attached to azo nitrogens and having, as the negative group attached to the tertiary carbons, the nitrile, carbonamide, or carbalkoxy group have increased activity at lower temperatures and, therefore, are preferred. Examples of these catalysts are:

alpha, alpha'-azodiisobutyronitrile-
$(CH_3)_2C(CN)—N=N—C(CN)(CH_3)_2$;
dimethyl alpha, alpha'-azodiisobutyrate-
$(CH_3)_2C(COOCH_3)—N=N—C(COOCH_3)(CH_3)_2$;
and similar catalysts described in the Hunt U. S. Patent 2,471,959.

The catalysts of the invention have short induction periods. They may, accordingly, be employed with advantage in continuous halosulfonating systems from which the products are removed rather soon after formation. Such a continuous process may be illustrated by the passage of a carbon tetrachloride solution of a normally solid polymer of ethylene continuously through a tubular reaction zone with an azo catalyst, gaseous sulfur dioxide, and gaseous chlorine; the zone being maintained under appropriate reaction conditions. In a continuous process the catalysts per se, or in suspension or solution, may be introduced at intermediate stages as the reaction proceeds. By such a method of introduction, a uniform product is discharged having an arrow range of chlorine and sulfur content. In static systems, hang-fires, which destroy uniformity of product, if not the entire value of the product, are avoided by operating in accord with the invention.

I claim:

1. In a process for the preparation of chlorosulfonated solid polymers of ethylene, the step which comprises reacting a normally solid polymer of ethylene, dissolved in carbon tetrachloride, with sulfur dioxide and chlorine at a temperature between 50° and 77° C. in the presence, as a catalyst for the reaction, of an organic azo compound wherein the azo, —N=N—, group is acyclic and bonded from both nitrogens to separate carbons aliphatic in character, at least one of which is tertiary, and one of the carbon atoms bonded to said tertiary carbon atom having its remaining valances satisfied only by elements of the class consisting of oxygen and nitrogen.

2. In a process for the preparation of chlorosulfonated solid polymers of ethylene, the step which comprises reacting a carbon tetrachloride solution of a normally solid polymer of ethylene with sulfur dioxide and chlorine at a temperature between 50° and 80° C. and in the presence, as a catalyst for the reaction, of from 0.1 to 2% based on the weight of the solid polymer of ethylene of alpha, alpha'-azodiisobutyronitrile.

3. In a process for the preparation of chlorosulfonated solid polymers of ethylene, the step which comprises reacting a carbon tetrachloride solution of a normally solid polymer of ethylene with sulfur dioxide and chlorine at a temperature between 50° and 80° C. and in the presence, as a catalyst for the reaction, of from 0.1 to 2% based on the weight of the solid polymer of ethylene of alpha, alpha'-azo bis alpha gamma-dimethylvaleronitrile.

JOHN S. BEEKLEY.

References Cited in the file of this patent

UNITED STATES PATENTS

| Number | Name | Date |
|---|---|---|
| 2,503,252 | Ernsberger | Apr. 11, 1950 |
| 2,507,526 | Jacobson | May 16, 1950 |